(12) United States Patent
O'Connell et al.

(10) Patent No.: US 7,551,121 B1
(45) Date of Patent: Jun. 23, 2009

(54) MULTI-TARGET-TRACKING OPTICAL SENSOR-ARRAY TECHNOLOGY

(75) Inventors: Daniel G. O'Connell, Kihei, HI (US); Ken C. K. Cheung, Kailua, HI (US)

(73) Assignee: Oceanit Laboratories, Inc., Honolulu, HI (US)

(*) Notice: Subject to any disclaimer, the term of this patent is extended or adjusted under 35 U.S.C. 154(b) by 232 days.

(21) Appl. No.: 11/079,145

(22) Filed: Mar. 14, 2005

Related U.S. Application Data (60) Provisional application No. 60/552,195, filed on Mar. 12, 2004.

(51) Int. Cl.
  *G01S 13/86* (2006.01)
  *G01S 13/66* (2006.01)
  *G01S 17/66* (2006.01)
  G01S 13/00 (2006.01)
  G01S 17/00 (2006.01)

(52) U.S. Cl. .............................. 342/54; 342/52; 342/53; 342/58; 342/59; 342/60; 342/61; 342/62; 342/73; 342/74; 342/175; 342/195; 244/3.1; 89/1.11; 235/400; 235/411; 235/412; 235/417

(58) Field of Classification Search .................. 89/1.11; 244/3.1–3.3; 342/27, 28, 52–62, 175, 195, 342/450–465, 13–20, 73–81, 104–115, 118, 342/128–147; 356/3–5.15; 235/400–418
See application file for complete search history.

(56) References Cited

U.S. PATENT DOCUMENTS

| | | | | |
|---|---|---|---|---|
| 3,161,870 A | * | 12/1964 | Pincoffs | 342/59 |
| 3,184,739 A | * | 5/1965 | Franklin et al. | 342/59 |
| 3,286,955 A | * | 11/1966 | French et al. | 342/62 |
| 3,378,835 A | * | 4/1968 | Mooney, Jr. et al. | 342/59 |
| 3,378,840 A | * | 4/1968 | Mooney, Jr. | 342/59 |
| 3,412,396 A | * | 11/1968 | Mooney, Jr. | 342/59 |
| 3,448,452 A | * | 6/1969 | Mooney, Jr. | 342/59 |

(Continued)

OTHER PUBLICATIONS

"R-11/SS-1B SCUD-A R-300 9K72 Elbrus/SS-1C SCUD-B"; no author listed; no date given; copyright 2000-2007; page last modified Apr. 28, 2005; posted on the Internet at globalsecurity.org.*

(Continued)

*Primary Examiner*—Bernarr E Gregory
(74) *Attorney, Agent, or Firm*—James Creighton Wray (57) ABSTRACT

The multi-target tracking and discrimination system (MOST) fuses with and augments existing BMDS sensor systems. Integrated devices include early warning radars, X-band radars, Lidar, DSP, and MOST which coordinates all the data received from all sources through a command center and deploys the GBI for successful interception of an object detected anywhere in space, for example, warheads. The MOST system integrates the optics for rapid detection and with the optical sensor array delivers high-speed, high accuracy positional information to radar systems and also identifies decoys. MOST incorporates space situational awareness, aero-optics, adaptive optics, and Lidar technologies. The components include telescopes or other optical systems, focal plane arrays including high-speed wavefront sensors or other focal plane detector arrays, wavefront sensor technology developed to mitigate aero-optic effects, distributed network of optical sensors, high-accuracy positional metrics, data fusion, and tracking mounts. Field applications include space monitoring, battlefield artillery, battlefield management, ground defense, air defense, space protection, missile defense, gunfire detection, and the like.

35 Claims, 5 Drawing Sheets

Illustration of MOST Concept

U.S. PATENT DOCUMENTS

| | | | | |
|---|---|---|---|---|
| 3,487,462 | A | * | 12/1969 | Holberg ........................ 342/59 |
| 3,560,971 | A | * | 2/1971 | Alsberg et al. ................. 342/62 |
| 3,821,751 | A | * | 6/1974 | Loos ............................ 342/59 |
| 3,981,010 | A | * | 9/1976 | Michelsen .................... 342/55 |
| 3,992,708 | A | * | 11/1976 | Olson et al. .................... 342/52 |
| 4,866,447 | A | * | 9/1989 | Loucks ......................... 342/58 |
| 5,296,860 | A | * | 3/1994 | Li ............................... 342/58 |
| RE36,944 | E | * | 11/2000 | Li ............................... 342/58 |
| 6,757,612 | B1 | | 6/2004 | Talent et al. |
| 6,784,408 | B1 | | 8/2004 | Cheung et al. |
| 7,046,187 | B2 | * | 5/2006 | Fullerton et al. .............. 342/54 |

OTHER PUBLICATIONS

E. Ehrlich et al, editors; "Oxford American Dictionary"; p. 668, definition of "station"; Oxford University Press; New York; 1980.*

"Space Surveillance Network" (Map); no date; no author; posted on line at wikimedia.org.*

"Astro: Space Traffic Control System"; Advanced Space Traffic Regulation Organization, Texas Space Grant Consortium, University of Texas; Arlington, Texas; Apr. 7, 1995; no author listed.*

S. Kawase, "Orbit Determination Accuracy For Optically Tracked Near-Synchronous Objects"; paper presented at the International Symposium on Space Dynamics; Biarritz, France; Jun. 2000.*

Dr. T.S. Kelso, "Space Surveillance"; "Satellite Times," Sep./Oct. 1997 issue; posted on the Internet at celestrak.com.*

Talent, D. L.; *Analytic Model for Orbital Debris Environmental Management*; Journal of Spacecraft and Rockets; vol. 29, No. 4; Jul.-Aug. 1992; pp. 508-513.

Mendell, W. et al.; *Telecommunications Satellite Constellations and the LEO debris Population*; International Aeronautical Federation; IAA-97-IAA.6.5.05; Paper presented at 48th International Astrological Congress; Oct. 6-10, 1997, Turin, Italy; 8 pages.

* cited by examiner

Figure 1. Illustration of HANDS Telescope System

Figure 4. High-Temporal-Bandwidth Focal-Plane Array

Figure 2

Figure 5 Illustration of MOST Concept

MULTI-TARGET-TRACKING OPTICAL SENSOR-ARRAY TECHNOLOGY This application claims benefit of priority of U.S. Provisional application No. 60/552,195 filed Mar. 12, 2004, which is incorporated herein by reference in its entirety.

FIELD OF INVENTION

The invention provides sensor technology and method for missile defense (target tracking and discrimination), battlefield management, artillery/gunfire locator, SAM defense, space-based warhead launch detection with superior speed and accuracy.

BACKGROUND OF THE INVENTION

In recent years, the proliferation of ballistic missile systems and weapons of mass destruction has increased. Currently it is estimated that there are more than 20 countries that possess ballistic missiles.

Clearly, the threat today is much different than that of the Cold War era, with a more complicated and dynamic geopolitical environment producing asymmetric threats. As a result, the United States (US) has placed highest priority on developing and fielding an effective and robust Ballistic Missile Defense System (BMDS).

The Missile Defense Agency (MDA) is charged to develop, test and prepare to field a missile defense system for the US. To accomplish this, MDA must develop weapons, sensors, communication systems and platforms that work in conjunction to detect, engage and disrupt ballistic missiles in all phases of flight—referred to as a "layered defense."

All ballistic missile trajectories consist of three phases—boost, midcourse and terminal. The boost phase is defined as the part of the missile's flight from the time of launch until it stops accelerating under its own propulsion system, typically the first 60 to 300 seconds of flight. While it is ideal to destroy the missile in the boost stage, the window of opportunity is relatively small, and the missile-defense elements (Airborne Laser) must be deployed near the launch location.

The midcourse phase of a ballistic missile trajectory follows a more predictable flight path, with the missile traveling essentially exo-atmospherically, or in very low Earth orbit. There is more time for BMDS elements to track and engage the target, but the missile can also deploy countermeasures at this phase. Midcourse missile defense elements (Aegis BMD) provide protection for large regions.

The terminal phase of flight starts when the missile re-enters the Earth's atmosphere, generally lasting less than 60 seconds. Terminal-phase missile defense (THAAD, PAC-3) provides very localized protection. Taken together, this layered-defense strategy gives BMDS the most opportunities to thwart a ballistic missile attack.

Just as space situational awareness (SSA) is the cornerstone of space control, battlespace awareness is the critical element of BMDS. Complete battlespace awareness requires a network of sensors that can identify and track all ballistic missile threats targeted at US forces and territories, as well as those of its allies.

Currently BMDS relies heavily on radar systems and space-based IR systems (launch detection). Current defense systems may not be sufficient to overcome enemy countermeasures (i.e., decoys). Clearly, as missiles and countermeasures become more advanced, needs exist for more advanced sensor and weapons systems to effectively mitigate the threat.

Needs exist for a high speed accurate detection and tracking system which overcomes conventional systems having insufficient speed and accuracy.

SUMMARY OF THE INVENTION

Oceanit's Multi-target Optical Sensor Technology (MOST) is a sensor technology and method for ballistic missile defense, battlespace-awareness enhancement and multiple-target discrimination. MOST integrates key components of successful Oceanit technologies to create a unique optical sensor capability that provides highly accurate positional metrics with wide field-of-view and at high temporal bandwidth, on a fast-tracking platform. These are described in applicant's applications: Ser. No. 10/128,433 (ARRAY OF LATERAL EFFECT DETECTORS FOR HIGH-SPEED WAVE-FRONT SENSING . . . ) filed Apr. 24, 2002, now U.S. Pat. No. 6,784,408; Ser. No. 09/189,381 (PHENOMENOLOGICAL ORBIT DEBRIS) filed Jul. 8, 2002, now U.S. Pat. No. 6,782,386; Ser. No. 10/290,527 (AUTONOMOUS ROBOTIC TELESCOPE SYSTEM) filed Nov. 8, 2002; and Ser. No. 10/290,543 (GLOBAL SPACE ENVIRONMENT TRACKING SYSTEM) filed Nov. 8, 2002; and all claiming priority of earlier filed provisional applications. Each of those applications is incorporated herein by reference in its entirety.

Although the technology can be employed to track missiles in all phases of its flight trajectory, it is preferably applicable for the midcourse phase and particularly, but not limited to, the terminal phase where complicated localized events involving countermeasures occur at extremely high speeds. MOST is designed to fuse with and augment existing BMDS sensor systems.

These and further and other objects and features of the invention are apparent in the disclosure, which includes the above and ongoing written specification, with the claims and the drawings.

DETAILED DESCRIPTION OF THE PREFERRED EMBODIMENTS

The present invention is a multi-target tracking and discrimination system and method that utilizes other Oceanit technologies to create a unique sensor system.

The invention can be integrated into and/or used in conjunction with all existing technologies including telescopes, optical systems, detectors, radars, and the like. The following are merely exemplary non-limiting embodiment(s).

The present invention utilizes an innovative telescope based on revolutionary optical principles. The telescope achieves an unprecedented diffraction-limited, for example, five-degree field of view, with single-pixel resolution over the entire focal plane, and produces extremely high-quality images. The innovative design may preferably use all spherical optics, making it lightweight and inexpensive to manufacture.

The wide field of view telescope is one of the primary components (see, for example, FIGS. 2 and 3) of Oceanit's High Accuracy Network Orbit Determination System (HANDS), one or more telescopes or a network of small optical telescope systems developed originally to produce highly accurate (10 m or less error in GEO orbit) satellite orbital metrics for Air Force space surveillance programs. The systems are described in applicant's applications: Ser. No. 10/128,433 (ARRAY OF LATERAL EFFECT DETECTORS FOR HIGH-SPEED WAVE-FRONT SENSING . . . ) filed Apr. 24, 2002, now U.S. Pat. No. 6,784,408; Ser. No. 09/189,381 (PHENOMENOLOGICAL ORBIT DEBRIS) filed Jul. 8, 2002, now U.S. Pat. No. 6,782,386; Ser. No. 10/290,527 (AUTONOMOUS ROBOTIC TELESCOPE SYSTEM) filed Nov. 8, 2002; and Ser. No. 10/290,543 (GLOBAL SPACE ENVIRONMENT TRACKING SYSTEM) filed Nov. 8, 2002; and all claiming priority of earlier filed provisional applications. Each of those applications is incorporated herein by reference in its entirety.

Figure 1:
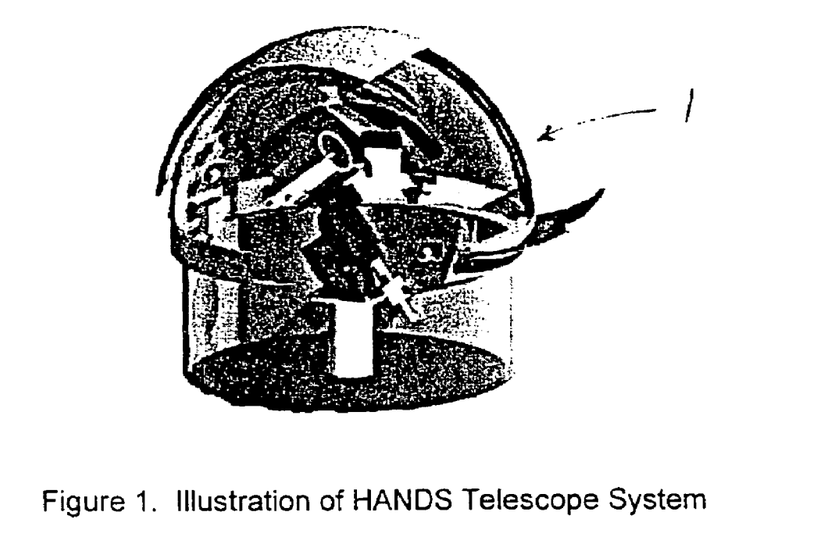
FIG. 1 shows a High Accuracy Network Orbit Determination System ground station.

FIG. 1 shows an illustration of a HANDS ground station 1, which is one element of a network of globally distributed optical stations providing both high-accuracy space surveillance orbital metrics as well as platforms for other advanced sensors. Currently, HANDS ground stations are deployed, or are under deployment, at Maui (MSSS), Edwards AFB, and Kwajalein, with potential future deployments to Kauai (PMRF), New Zealand, Western Atlantic, Europe and other strategic locations around the globe.

Figure 2:
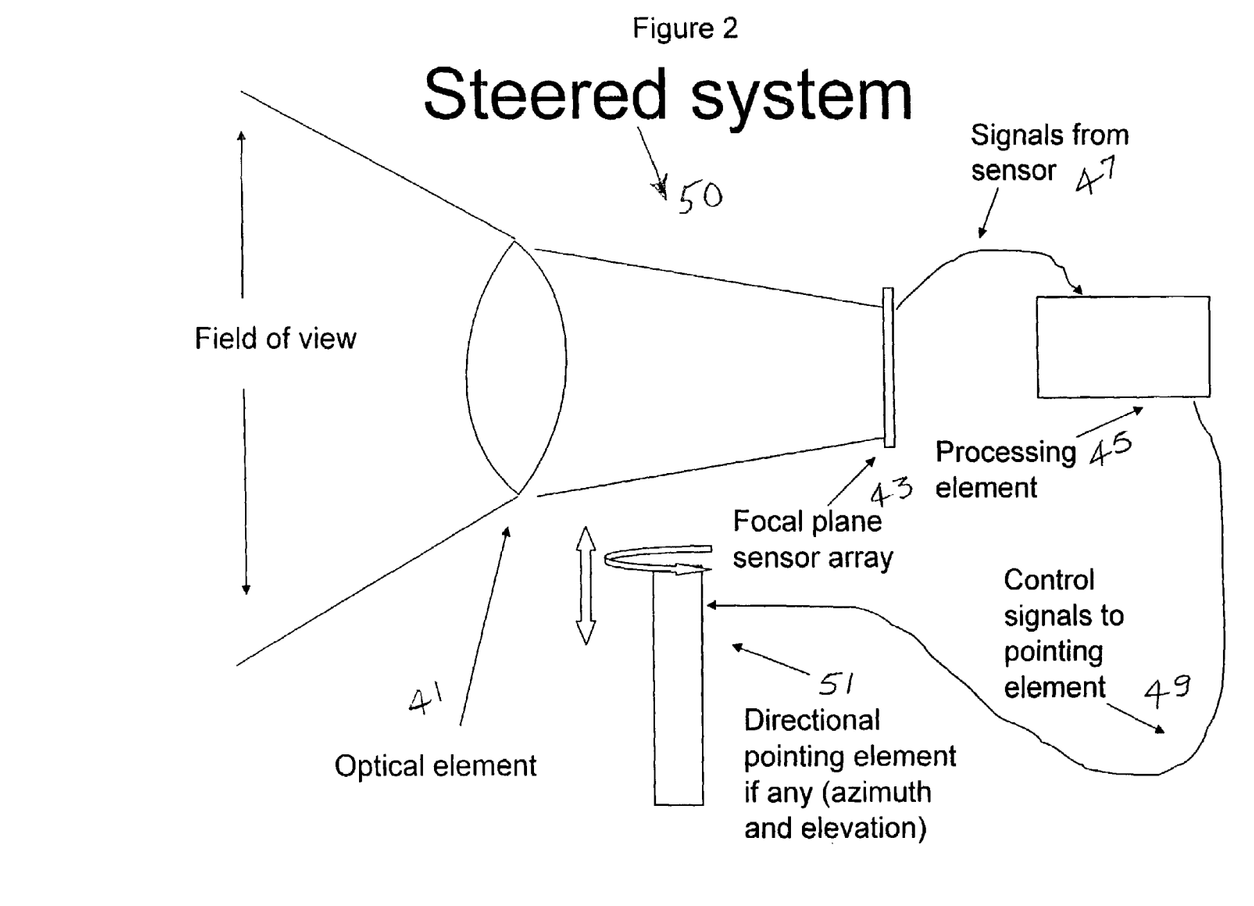
FIG. 2 shows a system description of an individual MOST sensor with a steering mount.

FIG. 2 shows a system 50 including an individual MOST sensor with optical element 41, sensors 43, steering, and signal processing sub-elements 45. The sensors 43 can be of multiple types. Signals 47 from the sensor are sent to the processing element 45, which performs mathematical functions. The directional pointing element 51 points the steered system in any desired direction. If the system 50 tracks objects by following their path through the sky, the pointing element 51 receives control signals 49 from the processing element 45.

Figure 3:
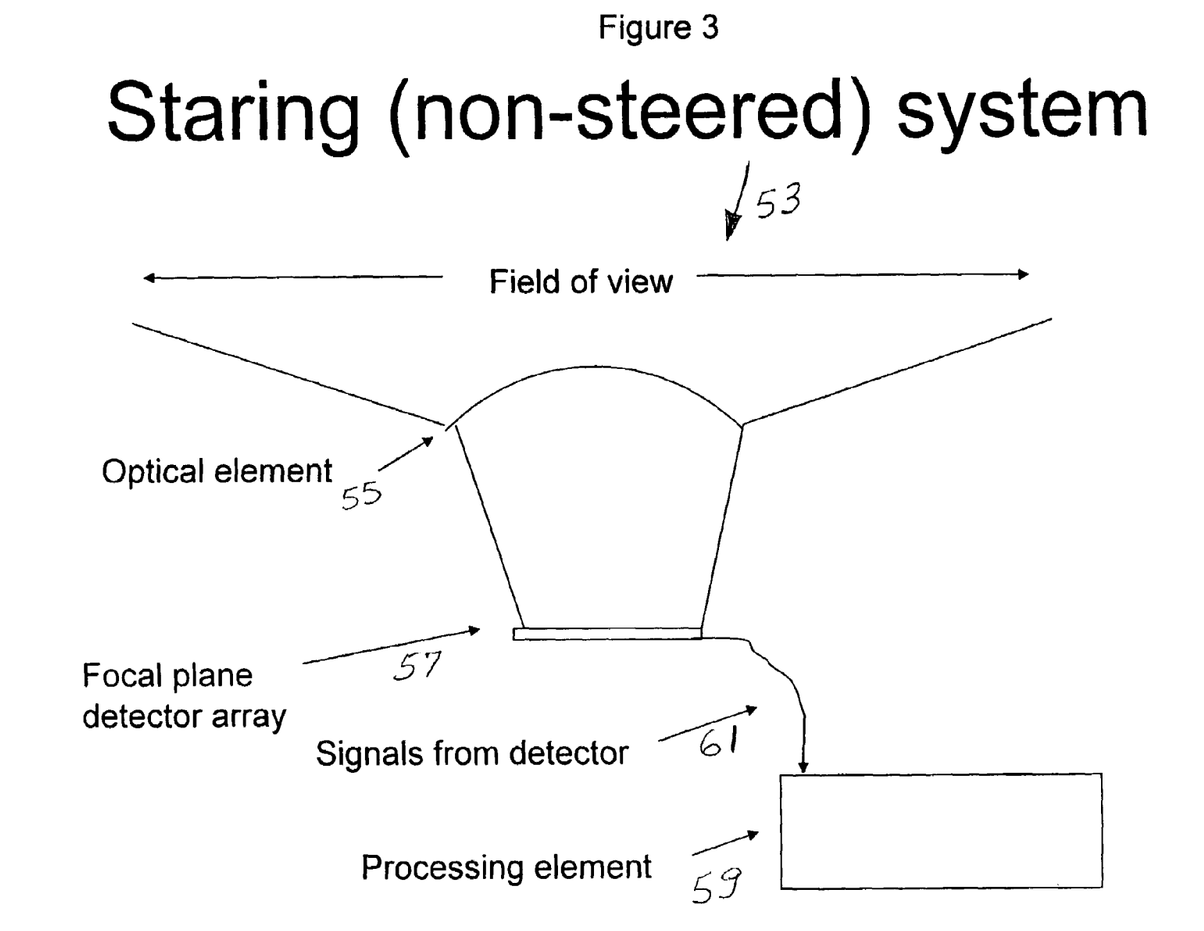
FIG. 3 shows an individual MOST sensor with a fixed mount.

FIG. 3 shows a non-steered system 53. Optical element 55 scans the atmosphere and focal plane detector array 57 collects and transmits data to processing element 59 as signals 61.

Figure 4:
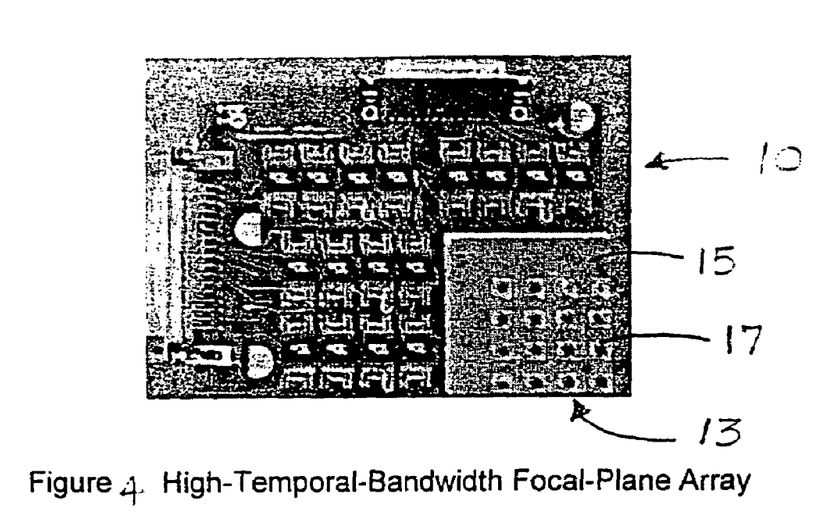
FIG. 4 shows a focal-plane array system with the detector array.

FIG. 4 shows a photograph of a prototype focal-plane array 10. The actual detector array 13 is shown in the lower-right-hand portion of the image, with a silicon substrate 15. In a preferred embodiment, for the adaptive-optics application, the detector 13 was designed, for example but not limited to, be in a 4×4 array module 17 that could be combined with other modules to form an 8×8 array. Other configurations are within the scope of this invention.

The invention also may utilize a revolutionary focal-plane-array technology and a high-speed wavefront sensor for an adaptive-optic system designed to mitigate aero-optic effects and provide high-speed, high accuracy positional data. This technology is applicable to airborne applications (e.g., ABL) to increase the capabilities of high-energy-laser (HEL) weapons.

The wavefront sensor is a Shack-Hartmann type sensor, but instead of a CCD array, the system uses an innovative array of lateral-effect detectors as described in the above identified co-pending applications and incorporated herein by references in its entirety. This increases the speed of wavefront sensing to a great extent, for example but not limited to, speed sensing from approximately 2 kHz real-time using CCDs to more than 20 kHz real time (with up to more than 75 kHz pseudo real-time). This is possible because each detector has significantly less outputs as compared with the equivalent CCD subaperture, and all centroiding is computed automatically in analog. This gives the detector array an unprecedented speed advantage over CCD arrays.

Figure 5:
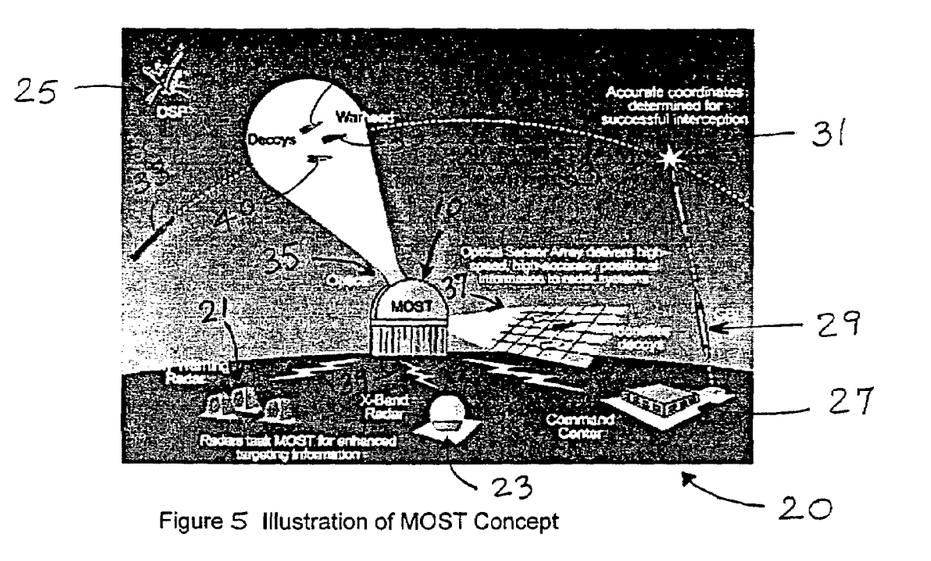
FIG. 5 shows the MOST system integrated with and augmenting existing BMDS sensor systems.

FIG. 5 shows the MOST system 10 fused with and augmenting existing BMDS sensor systems 20. Integrated are the early warning radars 21, X-band radars 23, DSP 25, and MOST 10 which coordinates all the data received from all sources through the command center 27 and deploys the GBI 29 for successful interception 31 of an object, for example, warhead 33.

The MOST system 10 integrates the optics 35 for rapid detection and with the optical sensor array delivers 37 high-speed, high accuracy positional information to radar systems 39 and also identifies decoys 40.

Figure 6:
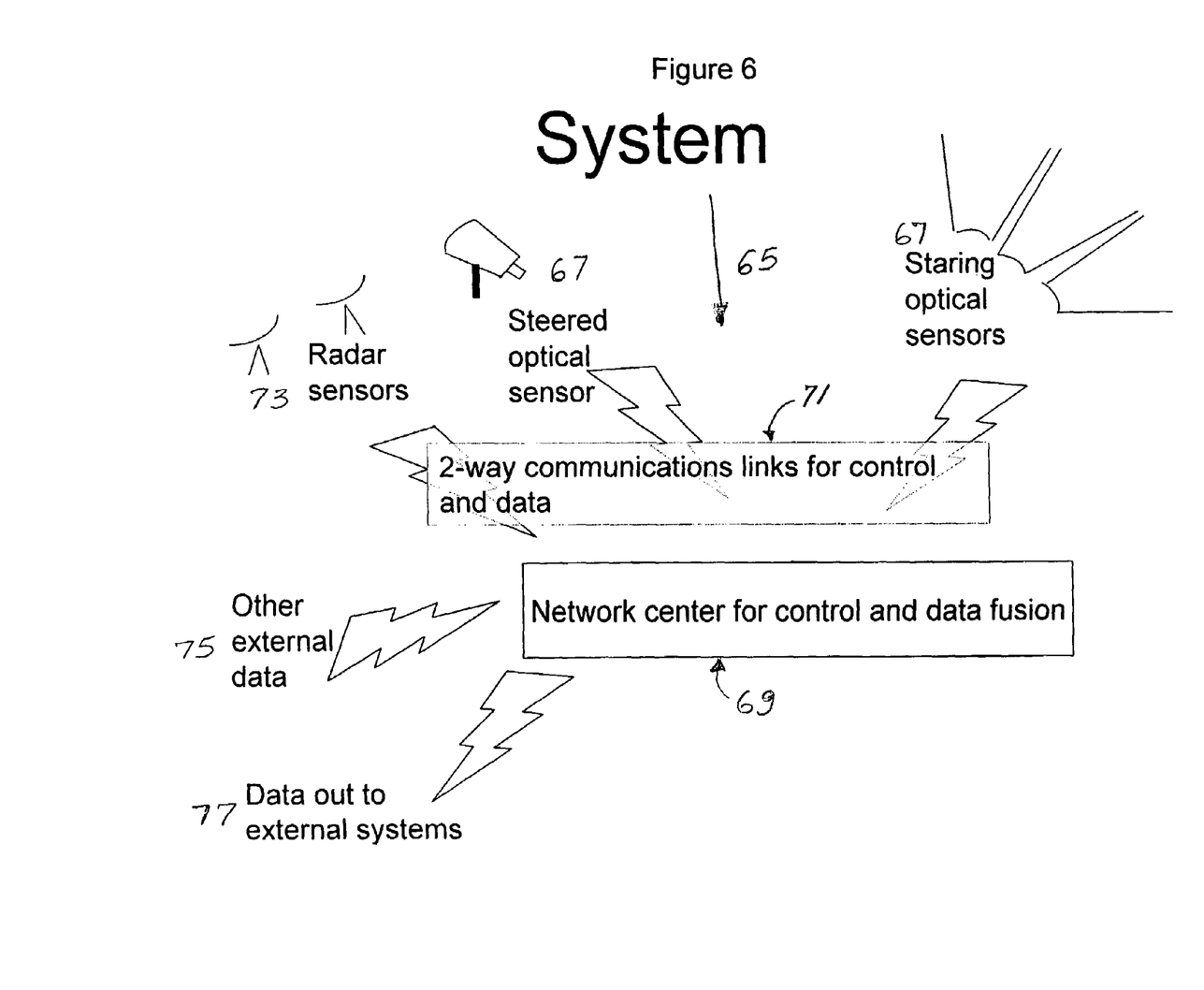
FIG. 6 shows a block diagram of the MOST system with individual MOST sensors, network center, and external data sources.

FIG. 6 shows an exemplary MOST system 65 with individual MOST sensors 67, network center 69 and external data sources: radars 73, other data 75. However, it could also use other sensors and optical systems including, for example any combination of lenses, mirrors, adaptive optics, that focuses image on the focal plane sensor. Central station 71 communicates with any or all the sources, receives, analyzes and transmits data, and network center 69 operates as a command center for receiving data, analyzing, and transmitting responsive actions to external systems 77.

MOST incorporates system elements shown in FIGS. 2 and 3 and successful technologies and methodologies developed by Oceanit in the areas of space situational awareness, aero-optics, adaptive optics, and Lidar. The primary components of MOST are as shown in FIGS. 2 and 3 and include, for example, but not limited to:

1. Wide-field-of-view optics—telescope technology developed for SSA, for example 2. High-speed focal plane array or other focal plane optical sensor element—wavefront sensor focal plane array technology developed to mitigate aero-optic effects and/or provide high speed positional information, or other focal plane optical sensor element (for example, CCD, CMOS, etc.)

3. Distributed optical network, high-accuracy positional metrics, data fusion—HANDS technology developed for SSA 4. Fast-tracking mount—shipboard directional Lidar Included in the technology is a focal-plane array based on Oceanit's wavefront sensor focal plane array technology, but having the following exemplary, but not limited to, improved characteristics:

More detectors, nominally an 8×8 configuration, but differing configurations (larger or smaller) are also possible Fill factor approaching 100% i.e. with minimum or zero spacing in between individual elements Super linear lateral effect detectors to improve calibration Smaller detectors Analog circuitry built on the back plane of the substrate to reduce size and weight Cooling and signal intensification to improve detector sensitivity Infrared capability The major MOST subsystem technologies include, but are not limited to, the following:

Wide-field-of-view telescope or other optical system that focuses the field-of-view image on the focal plane detector Focal plane array or other optical detector, high temporal bandwidth High speed mount
Software/Algorithms for metrics, discrimination MOST hardware elements include, but are not limited to:
Wide field-of-view telescope or other optical system
Fast-tracking mount
High-speed-centroiding detector array or single sensor
Analog and digital electronics, data acquisition, image intensifiers, cooling, etc.
Computer for control and data acquisition/analysis Preferably, two families of algorithms are included under the MOST program: high-speed, high-accuracy positional metrics algorithms and active multi-object discrimination algorithms.

The invention provides multiple target tracking and discrimination for missile defense and applications include, but are not limited to, the following fields:

Battlefield Artillery and Gun Locator—
  Imaging system to view the enemy lines, the horizon, ground or air based.
  "MOST" eyes attached to wide field imager provides precise trajectory calculator to enable rapid precision annihilation of enemy artillery.

Battlefield Management—
  Tracking multiple scud launches from space based or airborne platforms.
  Provide high-speed acquisition and tracking of multiple objects to augment radar shield to provide impenetrable defense shield.
  Prevent friendly fire.

Air Defense—
  High-speed tracking and battle-field shielding of shoulder launched surface to air missiles (SAMS) or rocket propelled grenade (RPG).

Air Defense—
  Track high-speed trajectory of ground based air defense guns.
  Provide rapid location to aircraft for pinpoint targeting and threat elimination using smart bombs.

Space Based Global Protection—
  Detect nuclear or conventional warhead launch from all continents.
  Provide rapid threat assessment and range determination and destination of all ground launch vehicles in boost phase.

The MOST system with its capabilities of tracking and discriminating multiple targets at high speed and accuracy, with its numerous applications, will be of interest to the Federal government (DoD), defense contractors, civil defense agencies and other contractors. Defense contractors in support of missile defense systems, battlefield management technologies, artillery/gunfire detection technologies and air defense systems could also use the system.

While the invention has been described with reference to specific embodiments, modifications and variations of the invention may be constructed without departing from the scope of the invention, which is described in the following claims.

We claim:

1. A multi-target tracking and discrimination system comprising at least one central station for receiving and processing information, at least one optical sensor station communicating with the at least one central station for detecting and relaying information about objects in space, optical stations distributed around the planet communicating with the central station for providing space surveillance orbital metrics data, a plurality of detectors communicating with the central station for providing information relative to the objects in space, and at least one command center communicating with the central station for coordinating and responding to data and information processed by the central station and launching responsive action reactive to the information and data, wherein the detectors comprise early warning radars, X-band radars, detector radars, lidar, and infrared space-based detectors and the command center integrates and coordinates data from the detectors and optical stations transmitted by the central station and positional information from the optical stations is sent by the central station to the radar and lidar, wherein the at least one optical sensor station comprises at least one focal-plane-array and at least one commercial off-the-shelf product.

2. The system of claim 1, wherein the optical stations comprise optical sensor arrays for delivering positional information and for identifying decoys.

3. The system of claim 2, wherein the optical sensor arrays comprise 20 kHz real-time or faster sample rate wavefront sensors.

4. The system of claim 3, wherein each wavefront sensor is comprises an array of lateral-effect detectors for 20 kHz real-time or faster sample rate wavefront sensing.

5. The system of claim 1, wherein the objects are selected from the group consisting of warheads, decoys, space debris, missiles, satellites, and combinations thereof.

6. The system of claim 1, further comprising at least one processor for data acquisition, processing, analysis, and outputting intelligible information, and wherein the communicating comprises communicating via a communication medium.

7. The system of claim 6, wherein the processor further comprises algorithms for processing data and for computing positional metrics and for tracking and discriminating objects in space.

8. The system of claim 7, wherein the system is disposed in fields selected from the group consisting of space monitoring, battlefield artillery, battlefield management, ground defense, air defense, space protection, missile defense, gunfire detection, and combinations thereof.

9. The system of claim 1, further comprising a telescope using all spherical optics with a five degree or greater field of view and single-pixel resolution over the entire focal plane.

10. The system of claim 1, wherein the optical stations distributed around the planet further comprises a plurality of optical stations forming a global optical network.

11. The system of claim 1, further comprising shipboard directional Lidar.

12. The system of claim 1, wherein the at least one focal-plane-array has a substrate with a back plane on which analog circuitry is built and infrared capability.

13. A method for multi-target tracking and discrimination comprising providing at least one central station, disposing optical detection systems around the planet, communicating the optical systems with the at least one central station, providing space surveillance orbital metrics with the optical systems, providing plural detectors including early warning radars, X-band radars, detector radars, lidar, and infrared space-based detectors, communicating the detectors with the central station, providing 20 kHz real time or faster sample rate wavefront sensor, mitigating aero-optic effects with the wavefront sensor, providing positional data with the wavefront sensor, providing a command center, communicating the command center with the at least one central station, receiving and processing information via the central station, conveying processed information to the command center, coordinating and integrating data received from all sources at the command center, initiating responses from the command center reactive to the processed information, sending positional information from the optical systems to the radar or lidar, and launching actions responsive to the initiating from the command center.

14. The method of claim 13, wherein the launching actions from the command center comprises deploying interceptions of object in space.

15. The method of claim 14, wherein the deploying interceptions comprises intercepting warheads.

16. The method of claim 13, wherein the communicating with the central station comprises integrating optics for rapid detection received from the optical systems, delivering positional information, tracking, detecting and identifying objects in space, discriminating the objects, and providing intelligible data to the command center thereby initiating appropriate response to detected objects.

17. The method of claim 16, further comprising processing information from the central station with a processor.

18. The method of claim 17, wherein the processing comprises acquiring data, analyzing the acquired data, computing positional metrics, tracking and discriminating objects detected.

19. The method of claim 18, wherein the communicating comprises communicating via a communication medium.

20. The method of claim 18, wherein the acquiring data comprises acquiring data from fields selected from the group consisting of space monitoring, battlefield artillery, battlefield management, ground defense, air defense, space protection, missile defense, gunfire detection, and combinations thereof.

21. The method of claim 18, wherein the acquiring data comprises acquiring data for battlefield artillery and gun locators.

22. The method of claim 21, further comprising imaging enemy lines, horizons, ground, air, battlefield environment, and combinations thereof.

23. The method of claim 21, further comprising attaching the wavefront sensor to a wide field imager and imaging the enemy lines or horizon and calculating trajectory for rapid annihilation of enemy artillery.

24. The method of claim 18, wherein the acquiring data comprises acquiring data for providing battlefield management.

25. The method of claim 24, further comprising tracking multiple missile launches from selective locations complementary to missile locations.

26. The method of claim 24, further comprising providing acquisition and tracking of multiple objects, augmenting radar shield and providing defense shield.

27. The method of claim 24, further comprising preventing friendly fire by providing accurate target tracking and discrimination.

28. The method of claim 24, wherein the acquiring data comprises acquiring data for providing air defense.

29. The method of claim 28, further comprising tracking and battle-field shielding of shoulder launched surface to air missiles or rocket propelled grenades.

30. The method of claim 28, further comprising tracking trajectory of ground based air defense guns.

31. The method of claim 28, further comprising providing location information to aircraft, pinpoint targeting, and eliminating threats with adequate counter measures.

32. The method of claim 24, wherein the acquiring data comprises acquiring data for space based global protection.

33. The method of claim 32, further comprising detecting nuclear or conventional missiles launched globally.

34. The method of claim 33, further comprising providing rapid threat assessment, determining range of missiles and determining destination of all ground launch vehicles in boost phase, disseminating data determined and initiating actions to counter the missiles.

35. The method of claim 13, further comprising coordinating data received from early warning radars, X-band radars, and DSP to deploy a ground-based interceptor.

* * * * *

UNITED STATES PATENT AND TRADEMARK OFFICE
CERTIFICATE OF CORRECTION

| | |
|---|---|
| PATENT NO. | : 7,551,121 B1 |
| APPLICATION NO. | : 11/079145 |
| DATED | : June 23, 2009 |
| INVENTOR(S) | : Daniel G. O'Connell and Ken C. K. Cheung |

It is certified that error appears in the above-identified patent and that said Letters Patent is hereby corrected as shown below:

In the Specification:

Column 1, line 3, insert the following paragraph:

--This invention was made with Government support under Contract No. HQ0006-04-C-0008 awarded by the Department of Defense. The Government has certain rights in this invention.--

Signed and Sealed this
Ninth Day of August, 2011

David J. Kappos
*Director of the United States Patent and Trademark Office*